United States Patent
McBurney

(10) Patent No.: US 7,057,554 B2
(45) Date of Patent: Jun. 6, 2006

(54) BOOTSTRAPPING TANDEM GPS NAVIGATION RECEIVERS

(75) Inventor: Paul W. McBurney, San Francisco, CA (US)

(73) Assignee: Eride, Inc., San Francisco, CA (US)

( * ) Notice: Subject to any disclaimer, the term of this patent is extended or adjusted under 35 U.S.C. 154(b) by 303 days.

(21) Appl. No.: 10/811,400

(22) Filed: Mar. 25, 2004

(65) Prior Publication Data

US 2005/0212695 A1    Sep. 29, 2005

(51) Int. Cl.
*G01S 1/00* (2006.01)

(52) U.S. Cl. .............................. 342/357.12; 342/357.02

(58) Field of Classification Search ........... 342/357.01, 342/357.02, 357.06, 357.12; 701/207, 213, 701/214
See application file for complete search history.

(56) References Cited

U.S. PATENT DOCUMENTS

| | | | | |
|---|---|---|---|---|
| 5,642,285 A | * | 6/1997 | Woo et al. ................... | 701/213 |
| 6,437,734 B1 | * | 8/2002 | McBurney et al. ..... | 342/357.09 |
| 2003/0227963 A1 | * | 12/2003 | Dafesh ....................... | 375/149 |

* cited by examiner

*Primary Examiner*—Dao Phan
(74) *Attorney, Agent, or Firm*—Thomas E. Schatzel; Law Offices of Thomas E. Schatzel, P.C.

(57) ABSTRACT

A bootstrapping tandem navigation receiver system includes two independent navigation receivers. A first uses coherent detection and makes carrier-phase pseudorange measurements. A second uses non-coherent detection and a longer predetection interval and thus can acquire satellites in very weak signal environments. The second navigation receiver delivers a bootstrapping message to the first receiver that allows it to directly acquire the satellites without searching for them. The first navigation receiver then drives to find carrier phase lock and produces its more accurate measurements.

9 Claims, 2 Drawing Sheets

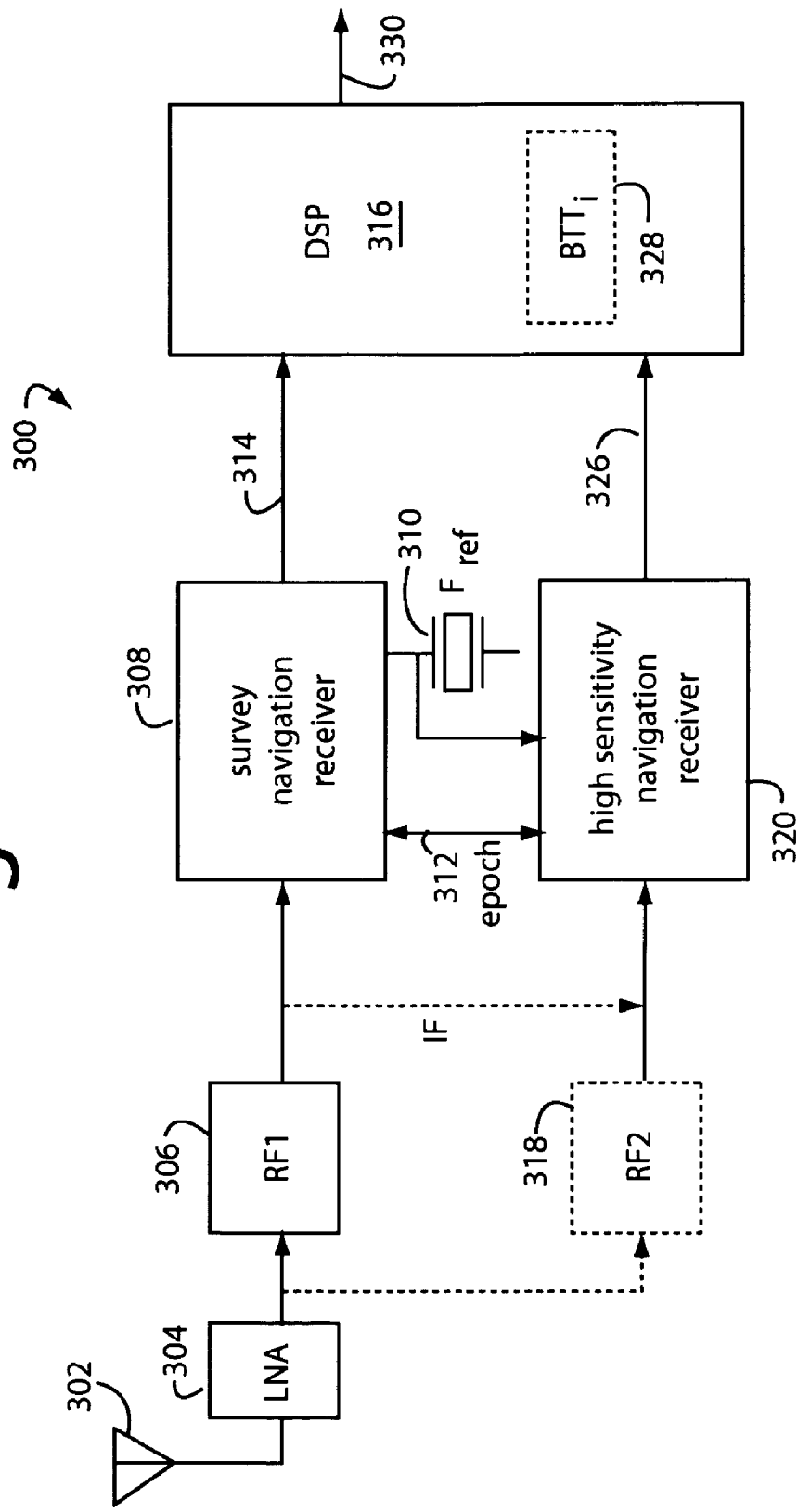

BOOTSTRAPPING TANDEM GPS NAVIGATION RECEIVERS

BACKGROUND OF THE INVENTION

1. Field of the Invention

The present invention relates to navigation receivers, and in particular to bootstrap initialization of one GPS navigation receiver with another in tandem.

2. Description of the Prior Art

A variety of global positioning system (GPS) navigation receivers are now commercially available for a number of applications. Each has some advantage over the other that is implemented by changes in the receiver design, especially in those circuits that acquire and track navigation satellites. Land survey GPS instruments are able to achieve millimeter level position accuracies by measuring the carrier phases of individual navigation satellite transmissions. Other receivers are particularly adept in sorting through the multipath signal distortions that occur in cities.

A new breed on GPS navigation receivers has emerged on the commercial market that are able to acquire and track navigation satellite signals that are exceeding weak and faint. Too attenuated for traditional navigation receivers, these highly sensitive receivers use various techniques including "aiding" to acquire and track navigation satellite signals Ordinarily, only one global positioning system (GPS) navigation receiver would be needed at any one location. So the prior art lacks references to the combining of one navigation receiver that helps another collocated one to initialize. It is far more common for precise frequency references that are locally available to be used to reduce the uncertainty in frequency searches of the satellite carriers. It is also conventional for remote servers with navigation receivers to remotely forward ephemeris and almanac data to reduce code search time and to be able to better predict Doppler.

SUMMARY OF THE INVENTION

Briefly, a bootstrapping tandem navigation receiver system embodiment of the present invention includes two independent navigation receivers. A first uses coherent detection and makes carrier-phase pseudorange measurements. A second uses non-coherent detection and a longer predetection interval and thus can acquire satellites in very weak signal environments. The second navigation receiver delivers a bootstrapping message to the first receiver that allows it to directly acquire the satellites without searching for them. The first navigation receiver then drives to find carrier phase lock and produces its more accurate measurements.

An advantage of the present invention is that a bootstrapping system is provided for land survey receivers to initialize quickly in weak signal environments and obtain measurements that would be impossible to acquire without the help of the bootstrapping receiver.

Another advantage of the present invention is that a method is provided for bootstrapping the initialization of one navigation receiver by another.

A further advantage of the present invention is that an integrated system is provided for driving a fine portion of an NCO with a coherent detection stage and a coarse portion of the NCO with a non-coherent detection stage.

These and other objects and advantages of the present invention will no doubt become obvious to those of ordinary skill in the art after having read the following detailed description of the preferred embodiments which are illustrated in the various drawing figures.

IN THE DRAWINGS

FIG. 3 is a functional block diagram of a bootstrapping tandem navigation receiver system embodiment of the present invention that share the same reference frequency and millisecond epoch.

DETAILED DESCRIPTION OF THE PREFERRED EMBODIMENT

Figure 1:
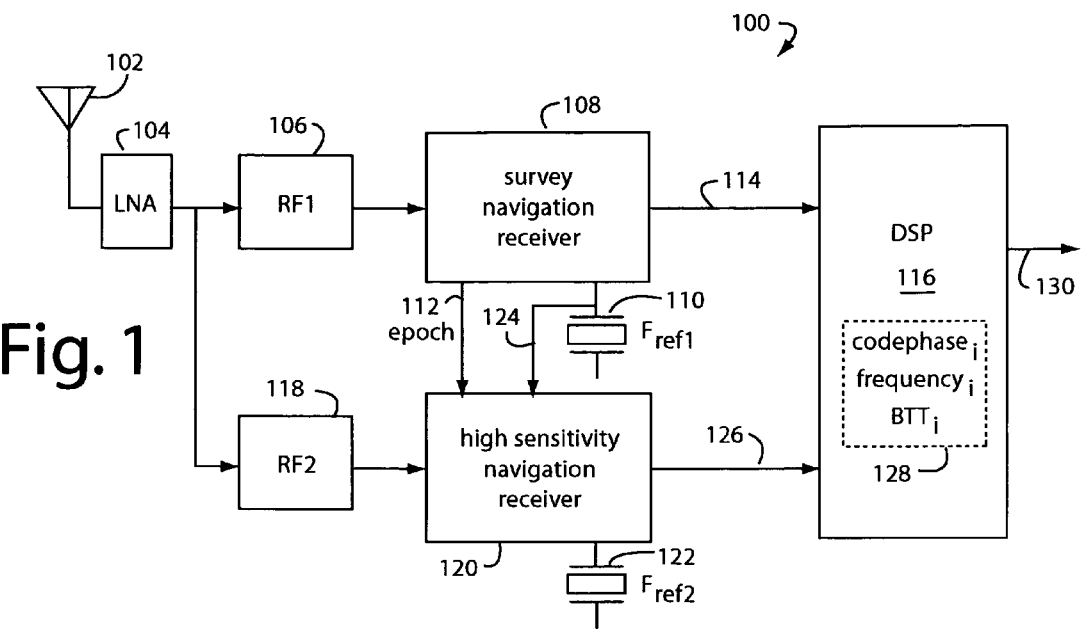
FIG. 1 is a functional block diagram of a bootstrapping tandem navigation receiver system embodiment of the present invention that have independent reference frequencies and millisecond epochs.

FIG. 1 represents a bootstrapping tandem navigation receiver system embodiment of the present invention, and is referred to herein by the general reference numeral 100. The bootstrapping tandem navigation receiver system 100 comprises an antenna 102 for receiving microwave signals from a constellation of orbiting navigation satellites, and a low noise amplifier (LNA) 104 that feeds two separate global positioning system (GPS) navigation receivers. A first radio frequency stage (RF1) 106 feeds such amplified signals to, e.g., a survey navigation receiver 108. Such can be similar to a Trimble Navigation land surveyor system that uses carrier phase measurements and coherent acquisition of the 50-Hz navigation data (NAV-data) transmissions. A first master clock 110 provides a first reference frequency to the survey navigation receiver 108. A one millisecond epoch signal 112 indicates the epoch reference for the local PRN generation and also NAV-data timing.

In particular, the system 100 is intended to perform in weak signal environments that a conventional Trimble Navigation land surveyor system would have difficulty in acquiring satellites. A sample data 114 is provided to a digital signal processor 116. Such conducts carrier frequency and codephase searches with RF1 106 and survey navigation receiver 108 using coherent one millisecond predetection interval (PDI) to find the instant in the NAV-data 50-Hz message when the phase changes, e.g., the bit transition time (BTT).

There are several methods that can be used to find the BTT. Most use the so-called dot-product detector. Coherent sums can be used if the variable dot=$I(k)*I(k-1)+Q(k)*Q(k-1)$, e.g., the dot I and Q are always coherent sums from 1–20 milliseconds.

The true BTT is a value from 1–20 msec. If "time=millisecond" in the GPS week, then BTT reference is the remainder of this time divided by twenty. GPS receivers look for the most likely value of BTT from 0–19, where the BTT reference of 0 is when the remainder[time/20]=0.

Alternative methods can be used simultaneously to see which BTT is most likely. Typically, twenty hypotheses of BTT are formed. For each hypothesis, a filter process is run which has the longest PDI that still straddles the BTT hypothesis. For example, if the BTT hypothesis is ten, then a filter is selected that sums from (−10 to 9), and (10 to 29). The BTT hypothesis of eleven would be associated with a filter that sums from (−9 to 10), and (11 to 30).

In order to find BTT, the true carrier frequency and the code peak must be tracked within 25-Hz, e.g., half the frequency of the navData. Otherwise, there is not enough integrated signal power to find the BTT phase reversal, or the remaining frequency error itself looks like a phase reversal. A longer PDI can be used just to track the frequency to within 25-Hz, and then any other PDI's can be used to estimate the location of the BTT phase reversal. For tracking, 5-msec and 10-msec PDI's could be used.

If the I or Q sum is large enough, the carrier loop can be updated. But if such sum is too small, the carrier loop is coasted and not updated. Running a Costas loop that unwinds the navData phase reversal is still difficult when coasting. The real frequency error might appear as a phase reversal, and could be subtracted from the phase detector, and not put enough phase error into the loop filter. Even so, a low dynamics and narrow bandwidth phase locked loop can be used to pull in the frequency error. Clearly such would represent sub-optimal tracking.

For non-coherent tracking, with sums of (I*I+Q*Q), and tracking the frequency by seeing which frequency hypothesis has the strongest power, the frequency can be tracked to within 25 Hz or less. Many frequency hypotheses can be formed with a small frequency step between each one, e.g., 10-Hz, and then drive the error to 5-Hz.

Such method can reach down much lower in signal strength than a coherent-only approach used in a survey receiver. Embodiments of the present invention can track the signal far below where the BTT detector works because even coherent 20-msec I and Q samples are very noisy for very weak signals. But even with a very weak signal and lots of noise, a histogram can be used to eventually determine the BTT. Such cannot be done in a typical survey receiver because they cannot reliably track signals fainter than the BTT detector will work.

So the particular PDI chosen for use is not as important as employing non-coherent frequency tracking to keep the carrier frequency error less than 25-Hz. Using the frequency and BTT estimated from the non-coherent tracking, the survey receiver can run another tracking loop at this frequency and BTT. Thus, the high-sensitivity receiver provides a coarse NCO frequency estimate. In this way, the survey receiver can estimate remaining frequency error with a very narrow band filter and then update a fine NCO that only makes fine adjustments in the estimate of the carrier frequency.

Embodiments of the present invention allow the survey receiver to track and estimate the carrier phase 10-dB to 15-dB below the point of what is possible without the aiding frequency and BTT from the high-sensitivity receiver.

A second radio frequency stage (RF2) 118 feeds amplified signals to, e.g., a high sensitivity navigation receiver 120. Such is, e.g., an e-Ride OPUS device with non-coherent frequency tracking and then multiple twenty millisecond PDI hypotheses to find the BTT. A second master clock 122 provides a second reference frequency to the high sensitivity navigation receiver 120. The first and second master clocks 110 and 122 are independent and asynchronous. So a sample 124 of the first master clock 110 and the millisecond epoch 112 are provided to the high sensitivity navigation receiver 120. Such is then able to compute the relative frequency and millisecond epoch differences between the two navigation receivers 108 and 120. Typically, a circuit that counts the number of master clocks of the bootstrapping receiver between the two receiver's msec reference will yield the time difference between the two msec epochs. Also, the number of survey receiver's master clocks in a period defined by the bootstrapping receiver's millisecond can be used to determine the frequency difference between the two frequency references.

The computation of the relative frequency and millisecond epoch differences is needed for the high sensitivity navigation receiver 120 to be able to bootstrap the initialization of survey navigation receiver 108. The bootstrapping is implemented through DSP 116 by depositing in a bootstrap message 128 the exact, master clock and millisecond epoch corrected frames, for the codephase, carrier frequency, and BTT for every satellite in the constellation of navigation satellites in view of antenna 102.

In alternative embodiments of the present invention, only the millisecond epoch is sent and not the master clock, since it is possible to determine both time and frequency difference with only the millisecond epoch.

In another alternative embodiment of the present invention, RF2 118 is eliminated and the high sensitivity receiver 120 taps into the survey receiver 108 final intermediate-frequency (IF) with a digital downconverter.

A data output 130 is made available after the survey navigation receiver 108 has been bootstrapped by the high sensitivity navigation receiver 120.

In weak signal environments, it turns out that the high sensitivity navigation receiver 120 will be able to find codephase, carrier frequency, and BTT for every satellite, well before the survey navigation receiver 108 ever will because of the differences in acquisition strategy, e.g., coherent and non-coherent detection and the differences in their respective PDI.

FIG. 1 illustrates how existing commercial products can be combined in a practical embodiment of the present invention. Two independent navigation receivers are used in which one bootstraps the initialization of the other. There is, therefore, a great deal of redundancy between the two navigation receivers that could be eliminated in a more integrated design.

Numeric controlled oscillators (NCO's) are used to phase lock loop the locally generated carrier replica to the carrier phases detected for each satellite. In the high accuracy land surveying navigation receivers, the NCO must resolve the phase to a tiny fraction of a cycle in order to do carrier phase measurements. In other navigation receivers, the NCO is much coarser, because there is no need for precise carrier phase. So in essence, the second navigation receiver 120 gets the first navigation receiver 108 on top of the autocorrelation code peak for each satellite and eliminates searching, but the first navigation receiver 108 then goes on to find the carrier phase measurement.

Figure 2:
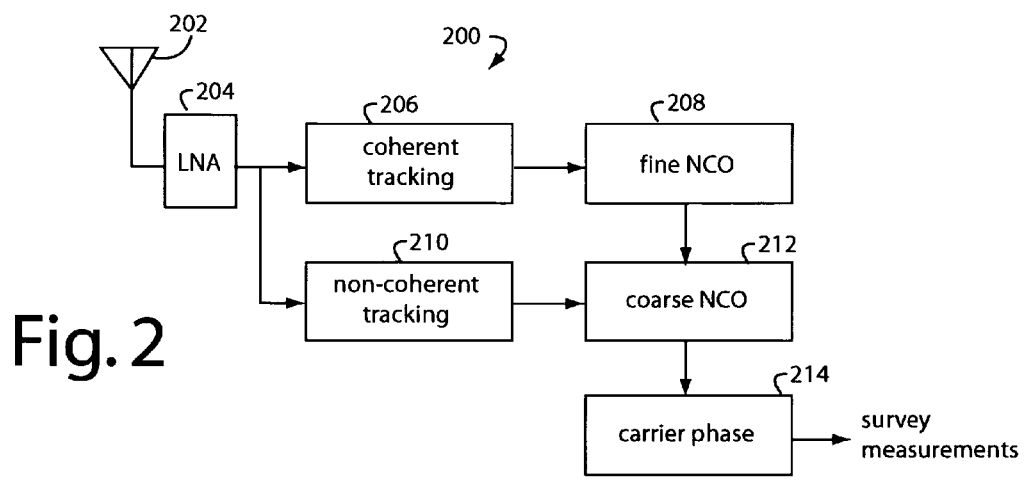
FIG. 2 is a functional block diagram of a integrated coherent/non-coherent navigation receiver embodiment of the present invention for carrier-phase pseudorange measurements.

An integrated coherent/non-coherent navigation receiver embodiment of the present invention is illustrated in FIG. 2. Such is referred to herein by the general reference numeral 200. The integrated coherent/non-coherent navigation receiver 200 is reduced here to the simplest functional blocks. An antenna 202 receives signals from orbiting navigation satellites that are input to a low noise amplifier (LNA) 204. A coherent tracking stage 206 is used to drive a fine-frequency portion 208 of a carrier phase NCO. A non-coherent tracking stage 210 is used to drive a coarse-frequency portion 212 of the same carrier phase NCO 214. Survey measurements are then made possible by the tandem approach to locking-in the NCO.

In operation, the coarse-frequency portion 212 of the carrier phase NCO 214 will find signal first. This getting the NCO into proximity allows the fine-frequency portion 208 to resolve the exact carrier phase.

A method embodiment of the present invention provides for rapid initialization of a carrier phase measurement navigation receiver in a weak signal environment. The method includes a step in which non-coherent tracking stage is used to drive a coarse portion of an NCO. A next step uses a coherent tracking stage to drive a fine portion of an NCO. Together, the whole NCO finds and tracks the navigation satellite transmissions and enables carrier-phase pseudorange measurements.

In an alternative embodiment of the present invention, the non-coherent receiver is integrated with the survey receiver. They both then share the same millisecond epoch and thus the time and frequency differences are non-existent and do not need to be communicated. The BTT is however critically communicated from the non-coherent receiver to the survey receiver.

FIG. 3 represents a bootstrapping tandem navigation receiver system embodiment of the present invention with a single frequency reference, and is referred to herein by the general reference numeral 300. The bootstrapping tandem navigation receiver system 300 comprises an antenna 302 for receiving microwave signals from a constellation of orbiting navigation satellites, and a low noise amplifier (LNA) 304 that feeds two different-type global positioning system (GPS) navigation receivers. A first radio frequency stage (RF1) 306 feeds such amplified signals to, e.g., a survey navigation receiver 308. Such can be similar to a Trimble Navigation land surveyor system that uses carrier phase measurements and coherent acquisition of the 50-Hz navigation data (NAV-data) transmissions. A master clock 310 provides a reference frequency to the survey navigation receiver 308. A one millisecond epoch signal 312 indicates the NAV-data timing.

In particular, the system 300 is intended to perform in weak signal environments that a conventional Trimble Navigation land surveyor system would otherwise have difficulty in acquiring satellites. A sample data 314 is provided to a digital signal processor 316. Such conducts carrier frequency and codephase searches with RF1 306 and survey navigation receiver 308 using coherent predetection interval (PDI) to find the instant in the NAV-data 50-Hz message when the phase changes, e.g., the bit transition time (BTT).

A second radio frequency stage (RF2) 318 feeds amplified signals to, e.g., a high sensitivity navigation receiver 320. For example, an e-Ride OPUS device with non-coherent PDI used to find the BTT. The detection of the BTT is needed for the high sensitivity navigation receiver 320 to be able to bootstrap the initialization of survey navigation receiver 308. The bootstrapping is implemented through DSP 316 by depositing in a bootstrap message 328 the exact BTT for every satellite in the constellation of navigation satellites in view of antenna 302.

The RF1 306 may be shared and RF2 318 eliminated. This alternative embodiment is shown in FIG. 3 with dotted lines for the intermediate frequency (IF) connection.

A data output 330 is made available after the survey navigation receiver 308 has been bootstrapped by the high sensitivity navigation receiver 320.

In weak signal environments, the high sensitivity navigation receiver 320 is able to find BTT for every satellite, and well before the survey navigation receiver 308 ever will because of the differences in acquisition strategy, e.g., coherent and non-coherent detection and, possibly, the differences in their respective PDI's.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A navigation system, comprising:
a first navigation receiver having a first millisecond epoch timing signal, a first reference frequency signal, and first antenna;
a second navigation receiver collocated with said first navigation receiver and having a second millisecond epoch timing signal, a second reference frequency signal, able to view an identical constellation of navigation satellites as said first navigation receiver, and able to ascertain codephase and frequency information about each of said constellation of navigation satellites before the first navigation receiver;
a connection from the first navigation receiver to the second navigation receiver for providing at least one of said first millisecond epoch timing signal and said first reference frequency signal such that the relative differences between corresponding said first and second millisecond epoch and reference frequency signals can be ascertained;
a bootstrap message from the second navigation receiver to the first navigation receiver for providing codephase and frequency information about each of said constellation of navigation satellites relative to said first millisecond epoch timing and reference frequency signals.

2. The system of claim 1, wherein:
the second navigation receiver includes non-coherent acquisition of the navigation data phase of each of said constellation of navigation satellites, and provides the bit transition time (BTT) in the bootstrap message.

3. The system of claim 1, wherein:
the first navigation receiver includes coherent acquisition of said constellation of navigation satellites and includes carrier phase measurements.

4. The system of claim 1, wherein:
the first navigation receiver and second navigation receiver are such that they share a common radio frequency (RF) downconversion stage.

5. The system of claim 1, wherein:
the first navigation receiver and second navigation receiver are such that the first reference frequency signal and second reference frequency signal are produced by the same oscillator source.

6. A bootstrap tandem navigation receiver system, comprising:
a survey navigation receiver for making carrier phase measurements and able to acquire individual navigation satellites with coherent techniques;
a high-sensitivity navigation receiver able to acquire individual navigation satellites with non-coherent techniques that can produce all twenty millisecond predetection interval (PDI) hypotheses for the bit transition time (BTT) of the navigation data phase of each of said individual navigation satellites; and
a bootstrapping message from the high-sensitivity navigation receiver to the survey navigation receiver that during initialization eliminates searching for the carrier frequency, codephase, and BTT of said individual navigation satellites by the survey navigation receiver.

7. A navigation system, comprising:
a first navigation receiver that includes coherent acquisition of a constellation of navigation satellites and includes carrier phase measurements, and further having a first millisecond epoch timing signal, a first reference frequency signal, and first antenna;
a second navigation receiver collocated with said first navigation receiver and including non-coherent acquisition of the navigation data phase of each of said constellation of navigation satellites, and able to view an identical constellation of navigation satellites as said first navigation receiver, and able to ascertain codephase and frequency information about each of said constellation of navigation satellites before the first navigation receiver; and
a bootstrap message from the second navigation receiver to the first navigation receiver for providing the bit transition time (BTT).

8. The navigation system of claim 7, wherein:
the second navigation receiver shares at least one of said first millisecond epoch timing signal and said first reference frequency signal.

9. A bootstrap tandem navigation receiver system, comprising:
a survey navigation receiver for making carrier phase measurements and able to acquire individual navigation satellites with coherent techniques;
a high-sensitivity navigation receiver able to acquire individual navigation satellites with non-coherent techniques that updates all twenty millisecond predetection interval (PDI) hypotheses for the bit transition time (BTT) of the navigation data phase of each of said individual navigation satellites with 20-millisecond coherent PDI's and determines the most likely BTT; and
a bootstrapping database for receiving informational messages from the high-sensitivity navigation receiver to the survey navigation receiver that during initialization eliminates searching for the carrier frequency, codephase, and BTT of said individual navigation satellites by the survey navigation receiver.

* * * * *